United States Patent
Yarvis

(10) Patent No.: US 7,400,248 B2
(45) Date of Patent: Jul. 15, 2008

(54) SENSOR DEVICES WITH RFID COMMUNICATIONS

(75) Inventor: Mark Yarvis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 10/997,595

(22) Filed: Nov. 24, 2004

(65) Prior Publication Data

US 2008/0084304 A1    Apr. 10, 2008

(51) Int. Cl.
G08B 13/14    (2006.01)
(52) U.S. Cl. ............. 340/572.1; 340/572.3; 340/572.4; 340/539.26; 340/568.1; 340/825.69; 340/10.1; 235/300; 235/301; 235/385
(58) Field of Classification Search ............... 340/572.1, 340/572.3, 572.4, 539.26, 568.1, 825.36, 340/825.49, 825.69, 10.1, 10.2; 235/300, 235/301, 384, 385
See application file for complete search history.

(56) References Cited

U.S. PATENT DOCUMENTS 5,426,284 A * 6/1995 Doyle ........................ 705/28
5,971,282 A 10/1999 Rollender et al.
6,600,428 B1 * 7/2003 O'Toole et al. ........ 340/825.36
7,030,760 B1 * 4/2006 Brown ..................... 340/568.1
2002/0067265 A1 6/2002 Rudolph

FOREIGN PATENT DOCUMENTS

| DE | 20013622 U1 | 11/1999 |
|----|----|----|
| EP | 0996105 A1 | 8/1999 |
| WO | WO 94/26043 | 11/1994 |

OTHER PUBLICATIONS

PCT/US2005/041391 International Search Report and Written Opinion Mailed Mar. 29, 2006.

* cited by examiner

Primary Examiner—Hung Nguyen
(74) Attorney, Agent, or Firm—John F. Travis

(57) ABSTRACT

A sensor device may use battery power to operate a sensor node by taking sensor readings and transferring data onto or out of a set of queues. A radio frequency identification (RFID) tag may be used to wirelessly communicate data into and/or out of the sensor device without using power from the battery. The sensor node may be placed in a low-power mode without respect whether the RFID tag is communicating. In some embodiments, the sensor device may be used as a store-and-forward node for other devices by placing data received from one RFID reader into the set of queues and later transmitting the data from the set of queues in response to a poll from another RFID reader.

9 Claims, 6 Drawing Sheets

SENSOR DEVICES WITH RFID COMMUNICATIONS

BACKGROUND

Sensor nodes may be used to monitor and/or measure various things such as temperature, humidity, vibration, light levels, sound levels, etc., and report the information thus gained to another device, where the information may be transferred, interpreted, used, etc. Some sensor nodes report the measurement information wirelessly by radio transmissions whenever directed to do so by an external device. It is frequently desirable to use such sensor nodes in areas that have no convenient source of electrical power, so battery-powered sensor nodes may be used. However, in many applications it may be infeasible to replace or recharge depleted batteries whenever they become discharged enough to render the sensor node unusable. Extending battery life as long as possible may be a major factor in making the use of battery-powered sensor nodes feasible.

Some sensor nodes may take sensor measurements only at infrequent intervals, and may enter a low-power mode for a long period of time between such measurements to reduce power consumption and extend battery life. If the percent of time the sensor node spends awake (powered up for a sensing operation) is a small fraction of the time it spends asleep (in a low-power inactive mode), then battery power consumption due to the sensing operations may be reduced substantially. However, transmitting the data wirelessly may consume considerable electrical power. In addition, if the sensor node must remain awake, or awaken frequently, to monitor for an indication that it is to transmit its data, battery life may be reduced even further.

BRIEF DESCRIPTION OF THE DRAWINGS

The invention may be understood by referring to the following description and accompanying drawings that are used to illustrate embodiments of the invention. In the drawings.

DETAILED DESCRIPTION

Figure 1:
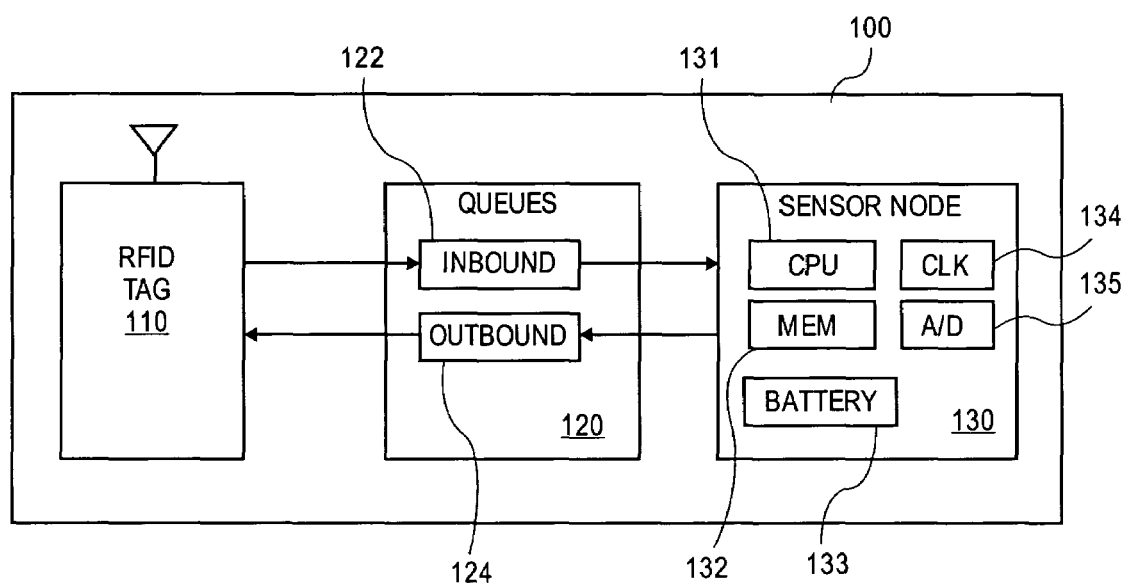
FIG. 1 shows a block diagram of a sensor device, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include a particular feature, structure, or characteristic, but not every embodiment necessarily includes the particular feature, structure, or characteristic. Further, the different embodiments described my have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements co-operate or interact with each other, but they may or may not be in direct physical or electrical contact.

The term "processor" may refer to any device or portion of a device that processes electronic data from registers and/or memory to transform that electronic data into other electronic data that may be stored in registers and/or memory. A "computing platform" may comprise one or more processors.

The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Various embodiments of the invention may be implemented in one or a combination of hardware, firmware, and software. The invention may also be implemented as instructions stored on a machine-readable medium, which may be read and executed by a computing platform to perform the operations described herein. A machine-readable medium may include any mechanism for storing, transmitting, or receiving information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces and/or antennas that transmit and/or receive those signals, etc.), and others.

Various embodiments of the invention may use a radio frequency identification (RFID) tag on a sensor device to wirelessly transfer data into and out of the sensor device, thus reserving battery power for the sensor node. By permitting the communications function to operate without consuming any power from the onboard battery, the sensor node may be awakened only for sensing operations and the effective battery life may be significantly extended. In some embodiments the RFID logic may also be used as a data relay point for communications between other devices.

FIG. 1 shows a block diagram of a sensor device, according to an embodiment of the invention. In the illustrated embodiment, sensor device 100 may comprise three main components: a sensor node 130 for sensing and/or measurement operations, an RFID tag 110 for communications into and out of the sensor device 100, and a set of queues 120 to hold data while it is being transferred between the RFID tag 110 and the sensor node 130.

Within the context of this disclosure, an RFID tag may be an electronic circuit adapted to receive incoming radio frequency energy through its antenna, use a portion of that energy to power its own circuitry, and operate that circuitry to modulate a radio frequency signal to transmit data out through the antenna. (Note: although some technical literature refers to an RFID tag 'reflecting' a modulated signal rather than 'transmitting' the signal, in this document the term 'transmit' and its derivatives will be used consistently to encompass both terms.) RFID tag 110 may also contain circuitry to perform additional operations. In some embodiments the transmitted data comprises an identification code that identifies the RFID tag that is responding, and by association, may identify the sensor device 100. The RFID tag may use any feasible RFID technology currently existing or yet to be developed that uses the incoming electromagnetic energy as a power source for the RFID circuitry. In some embodiments, the RFID tag 110 may be able to read data from outbound queue 124 and transmit that data as a part of a transmission from the antenna. In some embodiments, the RFID tag may be able to receive data that has been received through its antenna, and write that data into inbound queue 122.

Queues 120 may be used as temporary storage for data that is being passed between RFID tag 110 and sensor node 130. The queues 120 are shown as an inbound queue 122 for data that is being transferred from the RFID tag 110 to the sensor node 130 and an outbound queue 124 for data that is being transferred from the sensor node 130 to the RFID tag 110, but other embodiments may use other arrangements. Some embodiments that transfer data in only one direction may use only an inbound queue or only an outbound queue, but not both. The queues 120 may be physically implemented in any feasible manner, such as but not limited to shift register buffers, addressable memory, etc. In some embodiments the queues may be comprised of non-volatile logic that maintains its state when electrical power is removed. In some embodiments the queues may be implemented with non-volatile low power logic that can be operated with only the power received by the RFID tag 110 through its antenna, but other embodiments may use other techniques, such as using volatile logic powered by the battery in the sensor node.

The sensor node 130 may be used to perform sensing operations. The embodiment shown comprises a central processing unit (CPU) 131, a memory 132, a battery 133, a clock 134, and an analog-to-digital (A/D) converter 135. The sensor node 130 may also have, or have an interface to, a sensor, such as but not limited to a temperature sensor, a humidity sensor, a light sensor, etc. (not shown because there are too many types that may be used). The A/D converter 135 may take a signal from such a sensor and convert it into a digital value that can be processed by the digital logic in sensor node 130.

The CPU 131 may execute instructions in memory 132, and may read/write/operate upon data in memory 132. Memory 132 may comprise volatile and/or non-volatile memory of any suitable type. Battery 133 may provide electrical power to operate the various parts of sensor node 130. Clock 134 may be used to provide an operational clock source and timing information to CPU 131. In some embodiments, sensor node 130 may enter a low-power mode by stopping or slowing down clock signals to all logic except that needed to maintain the low-power mode, such as a sleep timer. In some embodiments, sensor node 130 may reduce the voltage level to various circuits when in the low-power mode. Either or both techniques may be used as a method of reducing power consumption. Data gathered from a sensing operation may be written into outbound queue 124.

In some embodiments, sensor node 130 may spend much of the time in a low power mode, awakening to an operational mode long enough to take a sensor measurement and write the relevant data into outbound queue 124, and then returning back to a low power mode until it is time to take another measurement. The RFID tag 110 may later retrieve the data from the outbound queue when the RFID tag is activated by incoming electromagnetic radiation, and transmit that data without further involvement of the sensor node 130. In some embodiments, writing data from the RFID tag 110 to the inbound queue 122 may cause the sensor node to wake up to retrieve that data from the inbound queue 122. Such a wake up action may be triggered by any feasible means, such as but not limited to an interrupt to the sensor node 230.

In some embodiments, during the low power mode a sleep timer may be substantially the only circuitry being powered by the battery, thus reducing power consumption to an extremely low level. Battery life may be significantly extended over that of conventional battery-powered wireless sensor devices by combining these three features: 1) using the battery-less RFID tag for communications, 2) using the battery-powered sensor node for taking measurements, and 3) using the queues to decouple the operations of the sensor node from the communications operations provided by the RFID tag.

An external device such as an RFID reader (not shown) may be used to gather sensor measurement data by polling the RFID tag 110 to read the data in outbound queue 124 and transmit that data to the external device. The external device may then process the measurement data and/or combine measurement data from multiple sensor devices for processing and/or forward the measurement data to another external device. In a similar manner, the external device may transmit data to sensor device 100 through the RFID tag. The data may be packaged into a packet or other format, and may be addressed so that if multiple RFID tags receive the message, only the one that is addressed will act on it. In some embodiments such data may include instructions or configuration information, such as but not limited to: 1) when or if to take measurements, 2) how to process measurements in the sensor node before placing the data in the outbound queue, 3) how the RFID tag should identify itself when polled, 4) whether to clear a particular queue of any data, 5) etc.

Figure 2:
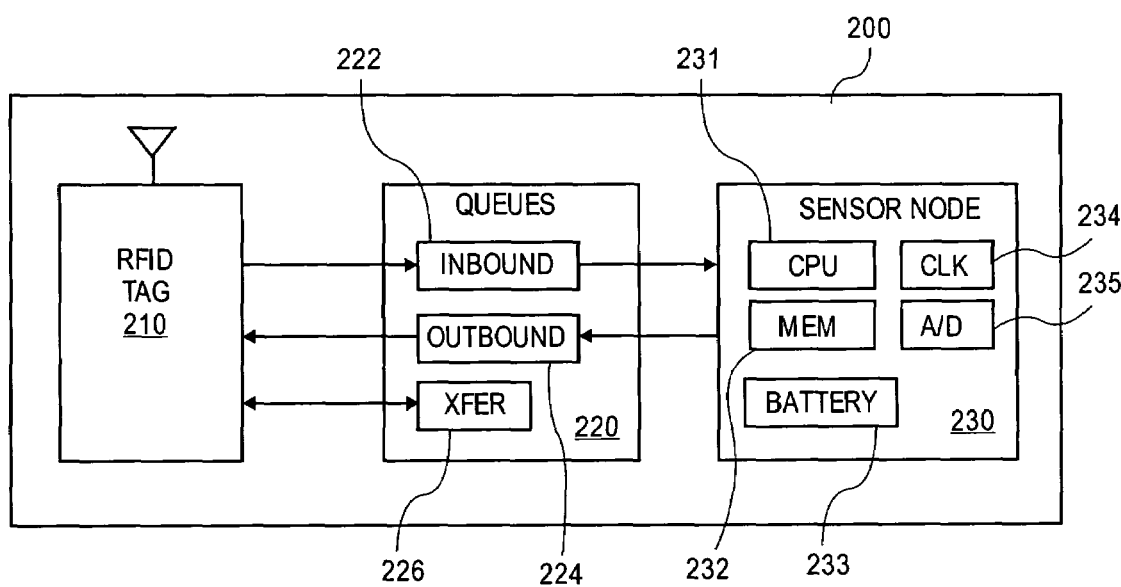
FIG. 2 shows a block diagram of another sensor device, according to an embodiment of the invention.

FIG. 2 shows a block diagram of another sensor device, according to an embodiment of the invention. Sensor device 200 of FIG. 2 may be much like the sensor device 100 of FIG. 1, except the sensor device 200 has an additional queue 226. For convenience and clarity, corresponding elements of FIGS. 1 and 2 are labeled 1xx and 2xx to indicate they may perform similar functions (for example memory 132 in FIG. 1 may correspond to memory 232 in FIG. 2), although various embodiments of the invention may not be limited in this respect. In some embodiments sensor device 200 may perform the same operations in the same way as sensor device 100, but may also perform additional operations by acting as a store-and-forward node for communications between two external devices.

If RFID tag 210 receives inbound data that is to be forwarded to another external device, such as another RFID reader, it may place that data into transfer queue 226. When RFID tag 210 is later polled by that other RFID reader, it may read the data from transfer queue 226 and transmit that data to the other RFID reader. Any feasible method may be used to distinguish between data that is to be forwarded in this manner and data that is to be ignored.

Figure 3:
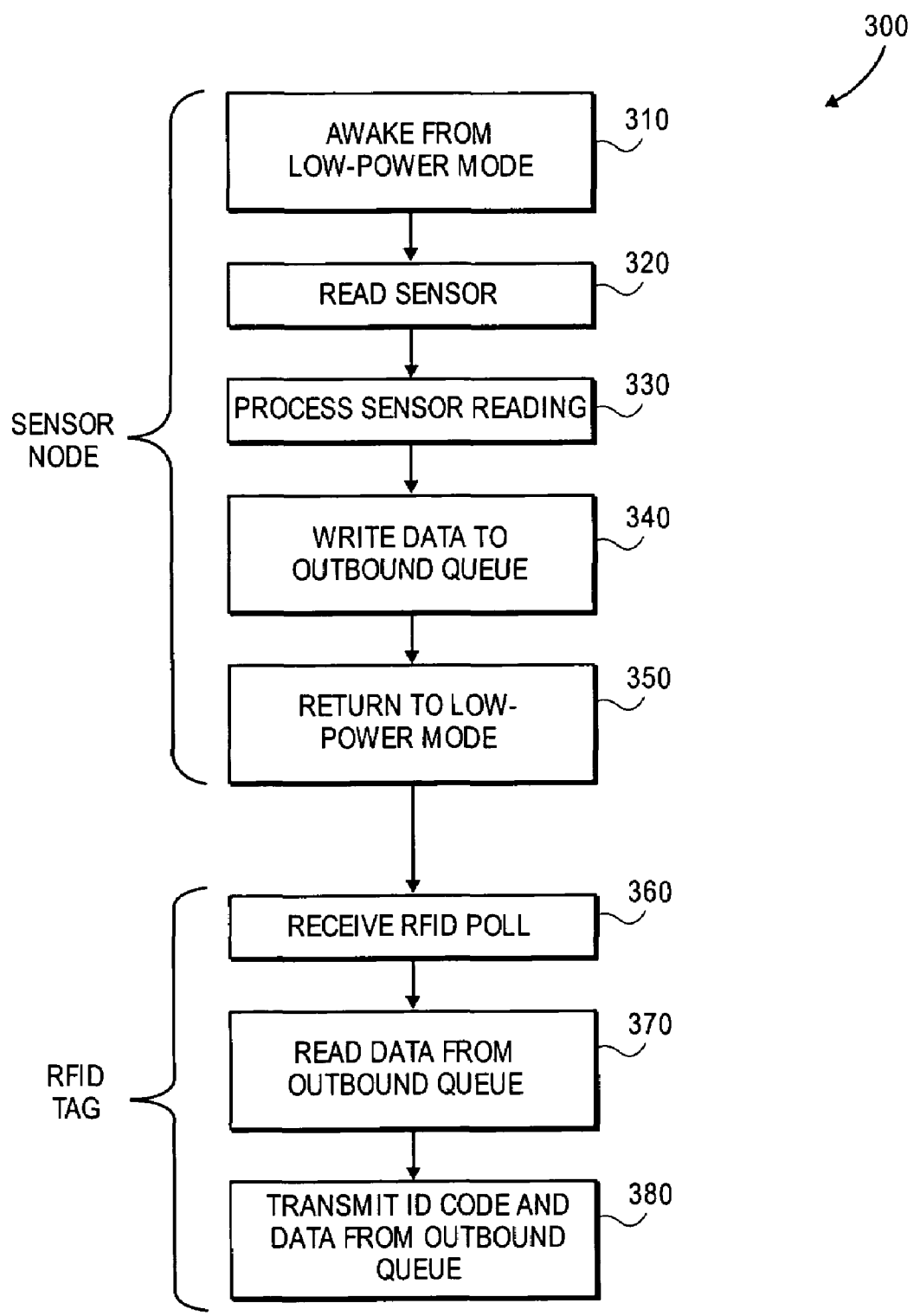
FIG. 3 shows a flow diagram of a method of measuring and transmitting sensor data, according to an embodiment of the invention.

FIG. 3 shows a flow diagram of a method of measuring and transmitting sensor data, according to an embodiment of the invention. In the illustrated embodiment of flow diagram 300, actions 310-350 may be performed by a sensor node, while actions 360-380 may be performed by an RFID tag, although other embodiments may vary from this arrangement. At 310, the RFID node may awaken from a low-power mode. This action may be triggered by any feasible means, such as but not limited to a counter time-out or an external stimulus. At 320 the sensor may be read. The sensor may be any feasible type of sensor, and may be internal or external to the sensor device. At 330 the sensor reading may be processed. Such processing may comprise any feasible action, such as but not limited to one or more of the following: 1) converting an analog value to a digital value, 2) converting the raw reading to normalized data, 3) averaging multiple readings, 4) referencing a table of values, 5) treating the data with an algorithm, 6) etc. Once the data is in suitable form, the data may be written to an outbound queue at 340. The sensor node may then return to the low-power mode.

Some time later, the RFID tag may receive an RFID poll at 360. An RFID poll may be electromagnetic radiation transmitted from an RFID reader that is intended to activate the RFID tag. In some embodiments, the poll may be non-specific and may activate any RFID tag within range of the RFID reader. In other embodiments the RFID poll may be directed to one or more specific RFID tags, and the RFID tag of FIG. 3 may have to determine if the poll is directed to it. Specific polls may indicate the intended target RFID tag in various ways, such as but not limited to modulating the electromagnetic radiation with a destination address. Once the RFID tag is activated, either by a non-specific or specific poll, the RFID tag may read the previously-stored data from the outbound queue at 370 and transmit that data at 380, along with an identification code that identifies the particular sensor device. In some embodiments, that identification may have been wholly or partly encoded in the RFID tag itself during manufacturing. The transmission at 380 may also include other information not specifically described herein.

Figure 4A:
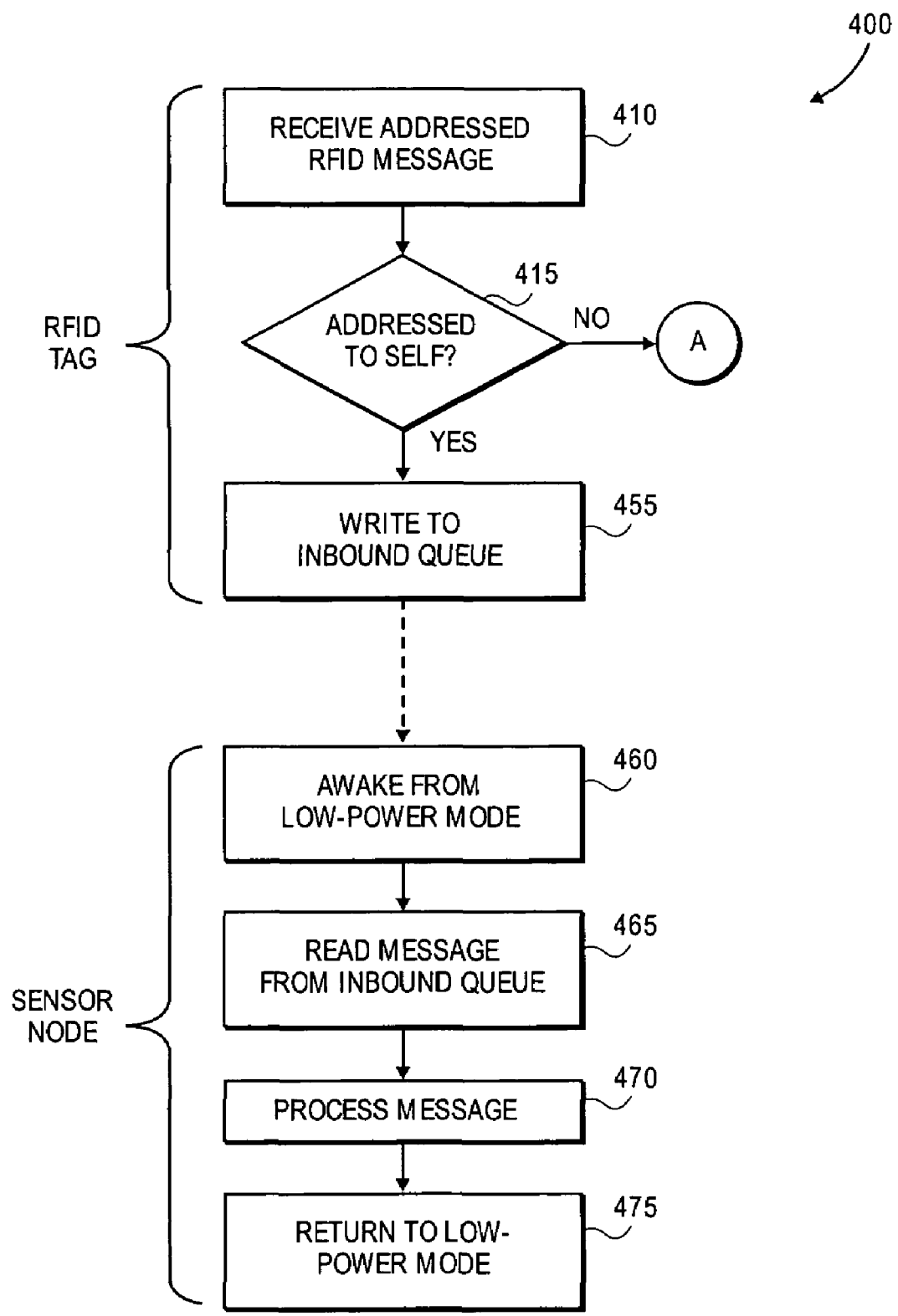
FIGS. 4A and 4B show a flow diagram of a method of receiving and processing data in a sensor device, according to an embodiment of the invention.
Figure 4B:
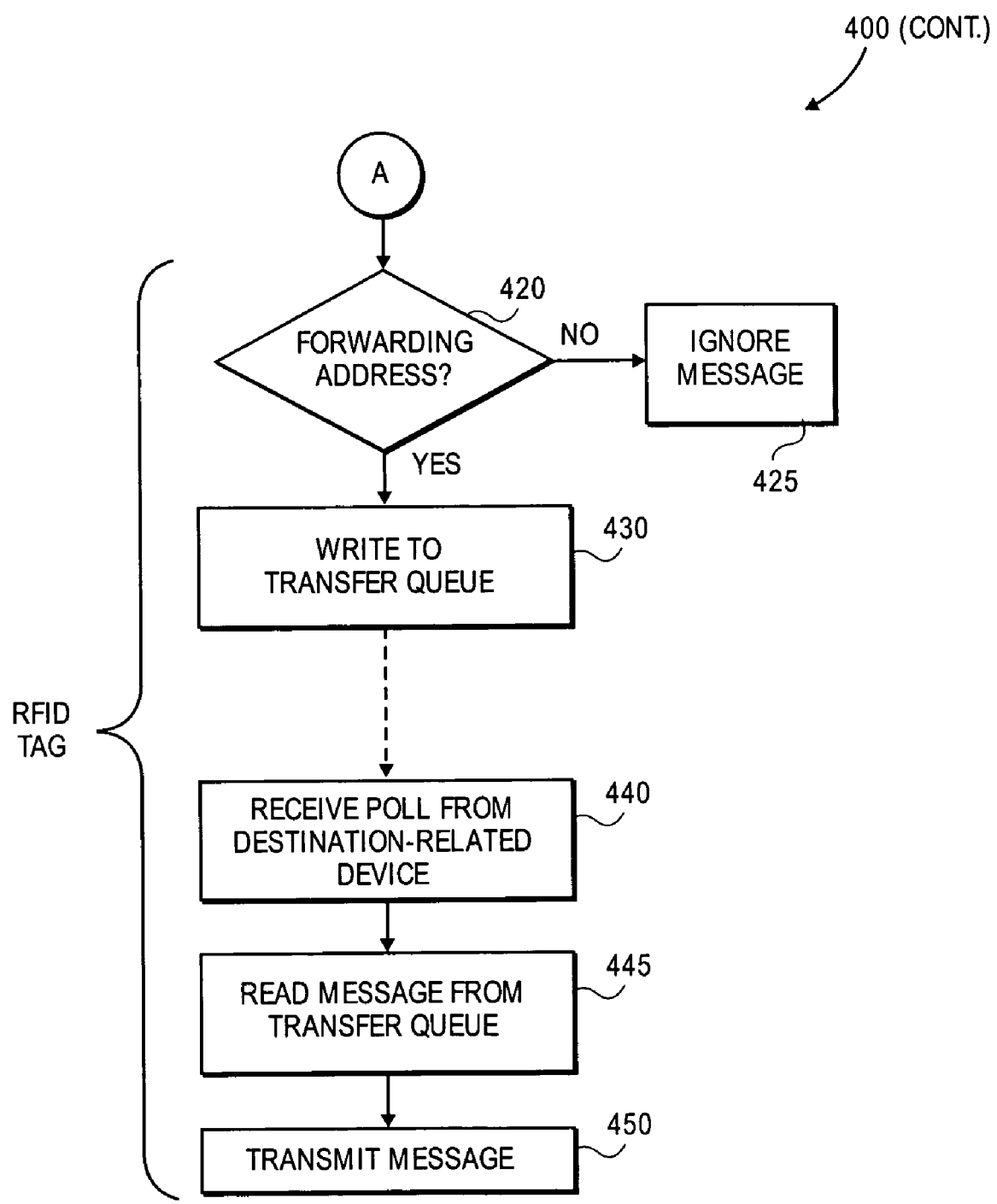

FIGS. 4A and 4B show a flow diagram of a method of receiving and processing data in a sensor device, according to an embodiment of the invention. In the illustrated embodiment of flow diagram 400, actions 410-450 may be performed by an RFID tag, while actions 460-475 may be performed by a sensor node, although other embodiments may vary from this arrangement. With reference to FIG. 4A, at 410 the RFID tag may receive an addressed RFID message, i.e., a message containing a destination address for the message. In addition, the message may contain other address(es), data, instructions, overhead information, etc. The destination address may be analyzed at 415 to determine if it is addressed to the sensor device that is performing the method of flow diagram 400. If it is, the message, or at least the pertinent parts of the message, may be written into the inbound queue at 455.

The sensor node may awaken from a low-power mode at 460. This awakening may be triggered by any feasible means, such as by the expiration of a time-out. In some embodiments, writing data to the inbound queue may trigger an interrupt or other signal that awakens the sensor node. The message may be read from the inbound queue at 465, and that message may be processed by the sensor node at 470. Such processing may include any feasible action, such as but not limited to: 1) examining the contents of the message and determining how to interpret those contents, 2) reconfiguring the sensor node operation based on the message, 3) changing the sleep timer parameters based on the message, 4) changing sensor processing operations (see 330 of FIG. 3) based on the message, 5) erasing data from one or more queues in response to an acknowledgment that the RFID reader received that data in a previous transmission, 6) etc. After all processing actions have been completed, the sensor node may return to a low-power mode at 475.

Returning to 415, if the message is not addressed to the sensor device performing the operations of flow diagram 400, then the destination address may be analyzed again at 420 (FIG. 4B) to determine if it indicates that the sensor device should act as a store-and-forward network node for the message. Any feasible addressing scheme and/or network configuration may be used in this determination. If the destination address does not indicate a store-and-forward operation, then it may be assumed the message is meant for another sensor device in the vicinity and the message may be ignored. However, if the destination address indicates that the sensor device should act as a store-and-forward node, the message, or at least a portion of it, may be written into the transfer queue at 430.

At some later time, at 440 the RFID tag may receive another poll, but this time from another RFID reader that is associated with the destination address of the message stored in the transfer queue. How the association is determined may depend on the addressing scheme and network configuration being used. The RFID tag may respond by reading the message from the transfer queue at 445 and transmitting that message to the RFID reader at 450, along with any other relevant data.

Figure 5:
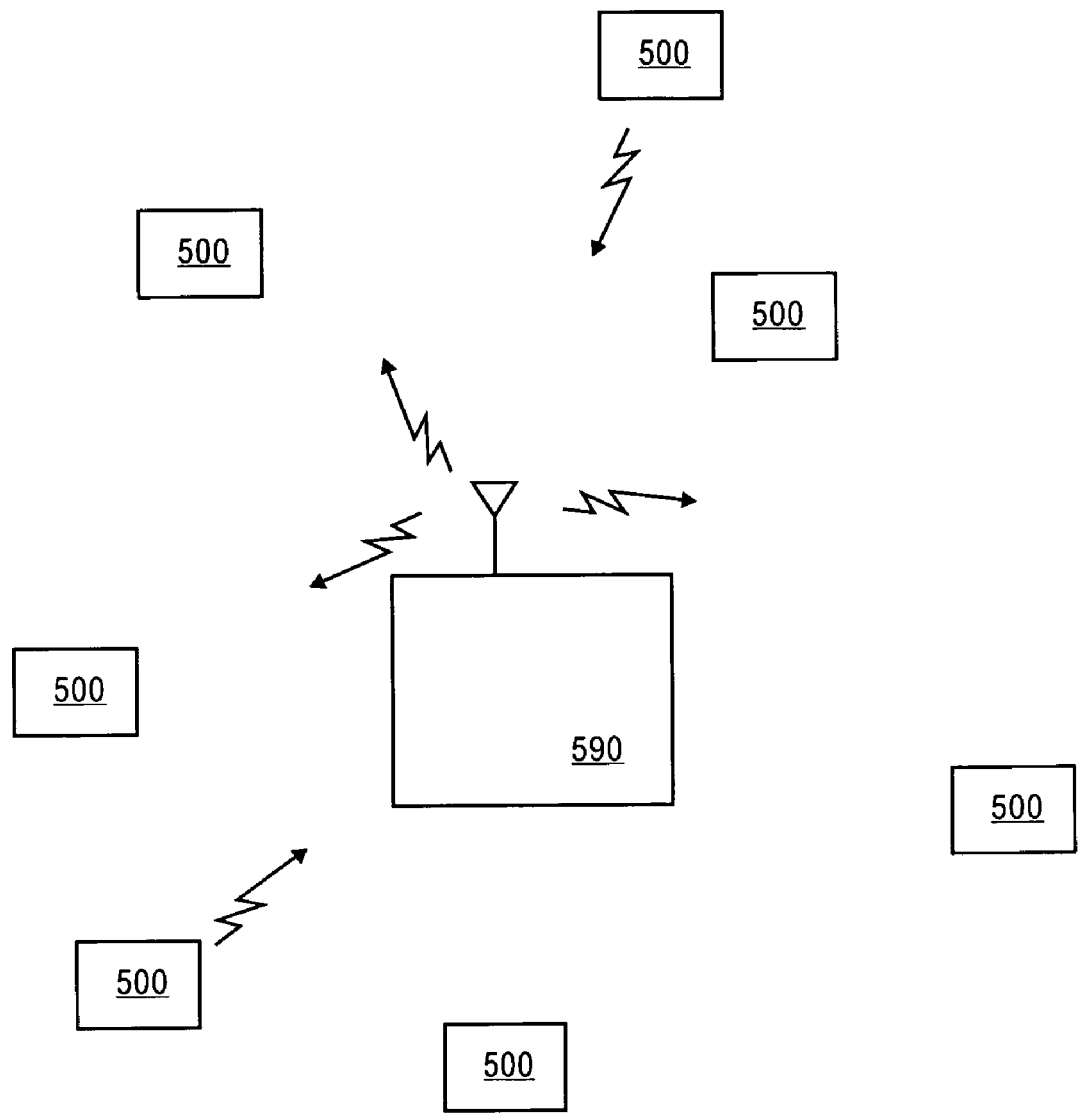
FIG. 5 shows a block diagram of an RFID sensor system, according to an embodiment of the invention.

FIG. 5 shows a block diagram of an RFID sensor system, according to an embodiment of the invention. In the illustrated embodiment of FIG. 5, RFID reader 590 may be a device that polls various sensor devices 500 that are within RFID communications range by transmitting electromagnetic radiation to the sensor devices and receiving responses from RFID tags on the sensor devices. Each sensor device may have a battery-powered sensor node, an RFID tag, and at least one queue to transfer data between the sensor node and the tag. Communications between the RFID reader 590 and any one of the sensor devices may follow any of the communications methods previously described, or other methods not previously described. Some of the sensor devices may also respond to one or more additional RFID readers (not shown).

The foregoing description is intended to be illustrative and not limiting. Variations will occur to those of skill in the art. Those variations are intended to be included in the various embodiments of the invention, which are limited only by the spirit and scope of the appended claims.

What is claimed is:

1. An apparatus, comprising:
   a sensor node having a timer to control a length of time for the sensor node to be in a low-power mode;
   a radio frequency identification (RFID) tag;
   a first queue coupled between the sensor node and the RFID tag to facilitate a transfer of first data from the sensor node to the RFID tag;
   a second queue coupled between the sensor node and the RFID tag to facilitate a transfer of second data from the RFID tag to the sensor node;
   a third queue coupled to the RFID tag, to store third data received by the RFID tag from a first RFID reader and to provide the stored third data for transmission by the RFID tag to a second RFID reader.

2. The apparatus of claim 1, wherein the sensor node is configured to write sensor data into the first queue when the sensor node is not in the low-power mode.

3. The apparatus of claim 1, wherein the sensor node is to process the second data from the second queue.

4. The apparatus of claim 1, wherein the sensor node is to be powered by a battery, but the RFID tag is not to be powered by the battery.

5. The apparatus of claim 1, wherein the RFID tag is configured to respond to a wireless addressed poll.

6. The apparatus of claim 5, wherein the RFID tag is configured to recognize a particular address in the wireless addressed poll and to transmit the first data in response to said recognition of the particular address.

7. The apparatus of claim 1, wherein the RFID tag is to:
store the third data received from the first RFID reader in response to a first poll from the first RFID reader; and
transmit the third data to the second RFID reader in response to a second poll from the second RFID reader.

8. A method, comprising:
taking a sensor reading with a sensor node;
placing first data representing the sensor reading into a first queue;
using a timer to place the sensor node in a low-power mode for a pre-determined time;
transmitting the first data in the first queue from a radio frequency identification (RFID) tag while the sensor node is in the low-power mode;
receiving an RFID poll containing second data;
placing the second data in a second queue; and
reading the second data from the second queue when the sensor node is not in a low-power mode.

9. The method of claim 8, wherein said transmitting comprises transmitting in response to an RFID poll.

* * * * *